United States Patent [19]

Bibl et al.

[11] Patent Number: 4,977,416

[45] Date of Patent: Dec. 11, 1990

[54] INTEGRATED THICK FILM ELECTROSTATIC WRITING HEAD

[75] Inventors: Andreas Bibl, Los Altos; George Fellingham, San Jose, both of Calif.

[73] Assignee: Rastergraphics, Inc., Sunnyvale, Calif.

[21] Appl. No.: 410,594

[22] Filed: Sep. 21, 1989

[51] Int. Cl.[5] .......... G01D 15/00

[52] U.S. Cl. .......... 346/155

[58] Field of Search .......... 346/154, 155

[56] References Cited

U.S. PATENT DOCUMENTS

| | | | |
|---|---|---|---|
| 3,626,422 | 12/1971 | Lloyd | 346/74 ES |
| 3,653,065 | 3/1972 | Brown, Jr. | 346/74 ES |
| 3,693,185 | 9/1972 | Lloyd | 346/139 C |
| 3,903,594 | 9/1975 | Koneval | 29/603 |
| 4,030,107 | 6/1977 | Tagawa | 346/155 |
| 4,054,885 | 10/1977 | Rothgordt | 346/74 ES |
| 4,092,650 | 5/1978 | Hinz | 346/155 |
| 4,163,980 | 8/1979 | Angelbeck et al. | 346/155 |
| 4,165,514 | 8/1979 | Ishima | 346/155 |
| 4,183,032 | 1/1980 | Ohbori et al. | 346/155 |
| 4,215,355 | 7/1980 | Moore | 346/155 |
| 4,271,417 | 6/1981 | Blumenthal et al. | 346/154 |
| 4,356,501 | 10/1982 | Ronen | 346/155 |
| 4,359,753 | 11/1982 | Marshall | 346/153.1 |
| 4,385,306 | 5/1983 | Conta | 346/155 |
| 4,415,403 | 11/1983 | Bakewell | 346/155 X |
| 4,424,522 | 1/1984 | Lloyd et al. | 346/154 |
| 4,447,821 | 5/1984 | Yuasa et al. | 346/154 |
| 4,466,020 | 8/1984 | O'Connell | 358/293 |
| 4,521,790 | 6/1985 | Allard | 346/154 |
| 4,636,816 | 1/1987 | Playe | 346/155 |
| 4,689,643 | 8/1987 | Playe | 346/155 |
| 4,719,481 | 1/1981 | Tuan et al. | 346/159 |
| 4,727,386 | 2/1988 | Playe | 346/155 |
| 4,766,450 | 8/1988 | O'Connell | 346/155 |

*Primary Examiner*—Donald A. Griffin
*Attorney, Agent, or Firm*—Lyon & Lyon

[57] ABSTRACT

An improved electrographic writing head employs interleaved arrays of writing nibs and small geometry, high impedance, thick film resistors and semiconductor driver circuits fabricated on separate glass epoxy substrates disposed in adjacent back to back relation. The writing head achieves significant savings in manufacturing costs by using low cost printed circuit and thick film technology. Power consumption may be reduced by more than half over prior art devices due to the high impedance of each thick film pull up resistor coupled with an associated writing nib. A ground plane is disposed between the adjacent substrates and between adjacent arrays of writing nibs. The ground plane prevents electrical interaction between the substrates and prevents the formation of parasitic nib-to-nib capacitance by shunting parasitic capacitance currents to ground. The ground plane thus reduces the possibility of flaring and substantially eliminates inadvertent writing by adjacent nibs.

10 Claims, 3 Drawing Sheets

INTEGRATED THICK FILM ELECTROSTATIC WRITING HEAD

BACKGROUND OF THE INVENTION

This invention relates to electrographic writing heads for recording information on a dielectric recording medium and in particular to an improved electrographic writing head employing interleaved arrays of writing nibs, small geometry thick film resistors and semiconductor driver circuits fabricated on adjacent glass epoxy substrates separated by a ground plane.

In the prior art, an electrographic writing head ordinarily consists of an array of electrodes, which are either wire wound or deposited on an insulating substrate. The electrodes terminate in writing nibs which are held close to the dielectric surface of a writing medium. The opposite surface of the writing or recording medium is conductive and is coupled with a counter electrode which is held at a predetermined voltage potential relative to the writing nibs.

Low voltage control signal lines may selectively address writing nibs or groups of writing nibs to cause an electrical discharge from the nib to the recording medium. The charge deposited on the recording medium is developed into an image by the application of a liquid or powdered toner which clings to the recording medium by electrostatic attraction between the deposited charge on the recording medium and oppositely charged colored toner particles.

The writing nibs are typically connected together in groups wherein the groups of nibs share control electronics. For example, many writing nibs may be connected together to a single high voltage driver circuit. This creates a multiplexed writing head. The counter electrode behind the recording medium is also segmented with each segment being energized synchronously with its corresponding group of nibs.

Although the multiplexing scheme according to the prior art reduces the number of switching elements, it also adds a considerable amount of complex circuitry. This added complexity for the sake of saving switching elements has several serious disadvantages.

A significant problem in prior art electrographic writing heads concerns the appearance of unwanted bands in written images at the counter electrode boundaries. Because all the writing nibs can not be energized simultaneously, they must also share the time it takes the recording medium to move from one scan line position to the next. This creates the need for relatively high speed and hence high power electronics on the writing heads. The increased power demand of a typical prior art multiplexed writing head raises cost by necessitating expensive power supplies and high power consumption. The increased power demand in prior art electrographic writing heads also reduces reliability.

Yet another problem inherent in prior art multiplexed electrographic writing heads, is that the constant switching of fairly high capacitance nib groups requires expensive high voltage driver circuits with high current sinking capability in order to attain reasonably fast writing speed. Therefore, at maximum plotting speeds, the power consumption of an entire multiplexed nib array can be significant.

Most prior art electrographic writing heads also suffer from a problem known as "flaring". This occurs when the charge deposited on the recording medium does not follow the outline of the nib delivering it, but rather spreads in an uncontrolled manner over the medium. Flaring is caused by excessive discharge from the writing nibs due to the buildup of energy in the capacitance that inherently exits between spatially adjacent writing nibs. Upon discharge of a writing nib, the energy of this stored capacitance may also be discharged, resulting in an arc which may be uncontrolled.

The severity of flaring depends upon the nib-to-nib and nib-to-ground capacitances. If these capacitances can be minimized, the flaring may be reduced, since the stored energy available for causing flares is also reduced.

A further disadvantage inherent in prior art multiplexed writing heads, wherein many nibs are connected to a single high voltage driver, is that plotting speed may be limited due to the need for a minimum write time of 20 to 30 microseconds per writing group. Any less writing time would result in severe image degradation. With an average of 50 nib writing groups, the speed at which one scan line may be drawn is determined by the product of the minimum writing time times the number of writing groups, thus approximately 1000 to 1500 microseconds. This translates into two inches per second at 400 lines per inch resolution or less than 1 inch per second at 1000 lines per inch. It will be appreciated that the prior art is severely limiting for high speed printing applications.

Another disadvantage of a prior art multiplexed writing head is the uneven charge distribution at the fringes of each nib group which may result in image striations or "banding" during the writing and toning process. This is a considerable problem in the prior art and many attempts have been made to minimize uneven charge distribution, but to no avail.

Attempts have been made to control banding by eliminating multiplexing. This is done by providing one high voltage driver circuit for every writing electrode or nib. However, these structures have the disadvantage of taking up prohibitively large amounts of space with so called mother boards, including large and bulky connectors and so called daughter boards which contain large numbers of high voltage drivers as well as pull-up and series resistors. These prior art interconnect schemes are unduly space consuming and are in addition prohibitively expensive and unreliable.

The prior art attempt to eliminate multiplexing through the connection of a high voltage driver with a single writing nib results in significant inter nib capacitance and flaring which occurs upon electrode discharge. In addition, in order to achieve reasonably fast RC writing time constants on the order of 100 microseconds, the value of the pull-up resistors needs to be fairly low. This however, has the disadvantage of high power dissipation and low reliability when several thousand nibs are switching simultaneously.

In the prior art, other attempts have been made to substantially reduce intercoupling capacitance and flaring by using thin film elements in an electrographic writing head. Thin film elements are disadvantageous because they are very expensive to manufacture and require complex processing techniques as compared to thick film elements which may be implemented on printed circuit boards.

Previously, it was thought impractical or impossible to use exclusively thick film elements in an integrated electrographic writing head. The lower limit of writing nib thickness is governed by catastrophic damage to the writing nib end due to disintegration upon application of a high voltage and subsequent discharge. Although it is possible to reduce the energy delivered to the nib, there is a limit as to how far the voltage can be reduced and still obtain a suitable writing discharge. It was further believed however, erroneously, that "[T]he upper limit of nib write end thickness is governed by a thickness that is too large providing too much capacitance and defeating the purposes sought after . . . ". See, for example, U.S. Pat. No. 4,776,450, issued Aug. 23, 1988 at col. 4, lines 24–27.

In view of the foregoing disadvantages of prior art devices, it is apparent that what is needed is an improved electrographic writing head which is able to achieve the seemingly contradictory objectives of maintaining fast RC time constants and high writing speed while minimizing power consumption.

What is also needed is an improved electrographic writing head which has greater reliability while at the same time minimizing inter nib capacitance and consequently reducing flaring and other nonconformities in plotting operations.

SUMMARY OF THE INVENTION

All of the foregoing disadvantages and deficiencies of prior art electrographic writing heads are solved by the present invention which employs for the first time standard printed circuit, thick film and surface mount assembly technologies including high impedance thick film resistors to produce an electrographic writing head wherein all elements including control circuitry are integrated onto a multilayer substrate. The present combination of thick film elements and non-multiplexed control circuitry result in a substantial savings in terms of manufacturing costs and power consumption over prior art electrographic writing heads.

The present invention provides an improved integrated thick film writing head manufacturable as a printed circuit for recording information upon a dielectric medium such as paper. The writing head according to the present invention incorporates an array of small geometry, high impedance thick film resistors associated with each writing nib for substantially eliminating inter nib capacitance and flaring. The thick film elements are screened on first and second high resolution glass epoxy substrates which are disposed in adjacent back to back relation. A multitude of integrated MOS driver circuits are provided on the substrates and each driver is individually coupled with a single writing electrode.

In a preferred embodiment, each writing electrode has a nib end for placing an electrostatic charge corresponding to a dot of information on a recording medium which is passed in close proximity thereto. The planar glass epoxy substrates have writing electrodes disposed in a linear array at an edge thereof such that said first and second arrays of writing nibs are offset in an interleaved pattern. Each nib of the first substrate is offset by one dot width relative to a nib of the second substrate in the direction along the plane of said substrates and the nib array of said first substrate is separated by two dot pitches from the nib array of said second substrate in a direction perpendicular to the plane of said substrates. A ground plane consisting of any conducting material is disposed between said first and second substrates and between the adjacent arrays of writing electrodes for controlling the shape of the electric field around each nib and for shunting electric field lines to ground.

A plurality of thick film high impedance resistor means are formed on the inner surfaces of said first and second substrates, each resistor means being coupled, preferably as close as possible, to a corresponding writing electrode for substantially eliminating the discharge current of stray capacitance formed between said writing electrodes.

A plurality of high voltage semiconductor switch means are also provided on the outer layer of said substrates wherein each switch means has its drain coupled with a corresponding one of said writing electrodes through said thick film resistor means. Each high voltage switch means selectively enables a corresponding writing electrode when said switch means is in a first state.

A high voltage line is provided on said first and second substrates for charging said writing heads to a high voltage when said corresponding switch means is in a first state.

An array of high impedance, thick film pull-up resistors are formed on the outer layer of said first and second substrates, each pull-up resistor connecting said high voltage line with said drain of a corresponding switch means for controlling the charging current applied to each writing nib when said corresponding switch means is in a first state. The ground plane provided between said first and second substrates also prevents electrical interaction between substrates and minimizes intercoupling between adjacent elements on the same substrates.

It will be appreciated that the integrated writing head of the present invention, provides substantial advantages over the prior art. The present writing head achieves significant savings in manufacturing costs over the prior art by using standard, low cost printed circuit and thick film technology. Moreover, power consumption is reduced by more than half over prior art devices because of the high impedance of each thick film pull-up resistor coupled with each writing nib. In addition, the interleaved, offset configuration of adjacent writing nibs provided on separate back-to-back substrates separated by a ground plane substantially eliminates inter nib capacitance and flaring during the electrographic writing process.

DETAILED DESCRIPTION

Referring to FIGS. 1, 2A, 2B and 3, two planar non-conducting substrates 1*a* and 1*b* are disposed in adjacent back-to-back relation. The inner surfaces of substrates 1*a* and 1*b* are bonded together according to well known printed circuit board techniques to a ground plane 2, thus forming an integrated writing head assembly 10.

In accordance with the present invention, the pull up and series resistors are formed on the outer and inner surfaces of planar substrates 1_a_ and 1_b_ by thick film techniques. Substrates 1_a_ and 1_b_ contain a plurality of writing electrodes 12_a_, 12_b_ which are configured in parallel arrays disposed on an inner surface and along one edge of each substrate 1_a_ and 1_b_ for depositing an electrostatic charge on a dielectric recording medium 3 which is passed in close proximity to the writing nib end of the writing electrodes. Because each substrate 1_a_ and 1_b_ has the same elements, the description may be simplified by referring only to the circuit elements on substrate 1_a_.

The array of writing electrodes 12_a_ consist of traces on a printed circuit board formed according to well known thick film techniques. Substrate 1_a_ is preferably a non conducting, glass epoxy material. Each writing electrode 12_a_ has a writing nib end disposed for depositing an electrostatic charge on a paper or other dielectric recording medium 3. The opposite end of each writing electrode 12_a_ is coupled in series with a corresponding high impedance thick film series resistor 14_a_. The thick film series resistor 14_a_ may be disposed on the outside surface of substrate 1_a_ as shown in FIG. 2_a_. In this case, each series resistor 14_a_ is coupled via a through hole 7_a_ with corresponding writing electrode 12_a_. In an alternate embodiment as shown in FIG. 2, each series resistor 14_a_ is fabricated by thick film techniques on the inner surface of substrate 1_a_ and is coupled directly to corresponding writing electrode 12_a_. It is preferable to place the series resistors 14_a_, 14_b_ on the inside surfaces of substrates 1_a_ and 1_b_ and as close as possible to the corresponding connected writing nibs 12_a_ and 12_b_ in order to eliminate inter-electrode capacitances and flaring.

Figure 3:
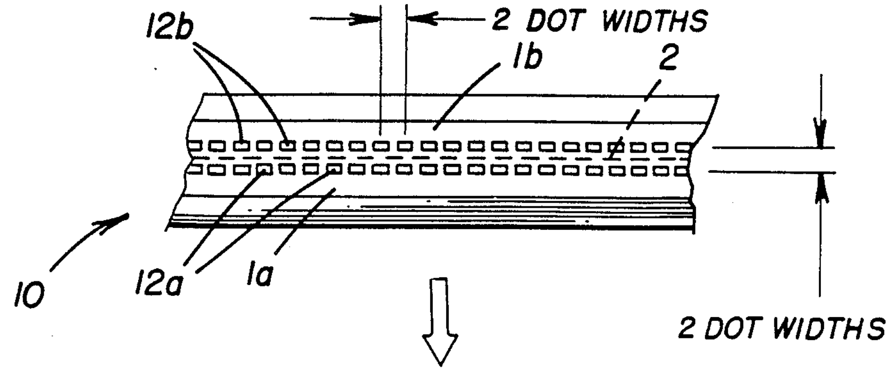
FIG. 3 is a top view of the electrographic writing head of the present invention.

In accordance with the present invention, the nib ends of the writing electrodes 12_a_ and 12_b_ are exposed in cross section at the edges of the substrates 1_a_ and 1_b_ where the nibs 12_a_, 12_b_ make contact with the recording medium as shown in FIG. 3. In order to enable the writing of dots of a given size at a pitch equal to their size, the writing electrodes 12_a_, 12_b_ of the respective substrates 1_a_ , 1_b_ are arranged in an offset, interleaved pattern as shown in FIG. 3. The writing electrodes on each substrate 1_a_ and 1_b_ are separated by two dot pitches along the plane of the substrates 1_a_, 1_b_. The arrays of writing electrodes 12_a_, 12_b_ are also separated by two dot pitches perpendicular to the plane of the substrates 1_a_, 1_b_. The arrays of writing electrodes 12_a_ and 12_b_ are also separated by ground plane 2. This separation between arrays of writing electrodes 12_a_, 12_b_ is compensated for by altering the relative timing of the signals controlling each array of writing electrodes 12_a_, 12_b_ since the separation is in the direction of relative motion between the writing head assembly 10 and the recording medium.

The ground plane functions as a means for preventing electrical interaction between adjacent substrates and for minimizing electrical interaction by shunting the electric field lines of writing electrodes to ground and shielding the writing electrodes of one substrate from the writing electrodes disposed on the opposite substrate. Referring now to FIGS. 2_a_, 2_b_ and 3, the ground plane is comprised of any conducting material, but is preferably metal. The ground plane typically is spaced away from the nibs at a distance on the order of the width of a writing nib. The ground plane 2 is extremely important in controlling the shape of the electric field lines around each individual writing nib of the writing electrodes 14_a_, 14_b_. When there is a large voltage differential between adjacent writing electrodes 12_a_, 12_b_ on opposite substrates 1_a_, 1_b_ the ground plane acts to control the shape of the field around the energized writing nib and shunts the electric field lines to ground. It is been found that the electric field lines of high writing voltages at an energized writing nib can be effectively terminated at the ground plane thereby substantially eliminating cross-talk between the nibs. The ground plane 2 is preferably a continuous plane or screen of metal or other conductive material. Accordingly, the ground plane provides a means for terminating electric field lines developed around the writing nibs upon discharge. In the preferred embodiment, the ground plane is electrically isolated from the writing nibs by a thin layer of the nonconducting epoxy material. It has been found that the effect of the ground plane in controlling the shape of the electrical field around the writing nibs 12_a_, 12_b_ can be maximized if each array of writing electrodes 12_a_, 12_b_ is spaced apart from the ground plane at a distance equal to or less than the width of a writing nib. However, the ground plane should be as close as possible to the nibs. It will be appreciated that the ground plane 2 enables the opposing substrates 1_a_, 1_b_ to be placed back to back without electrical interaction. It has also been found that the ground plane substantially eliminates intercoupling capacitance between nibs and effectively eliminates flaring.

Figure 4:
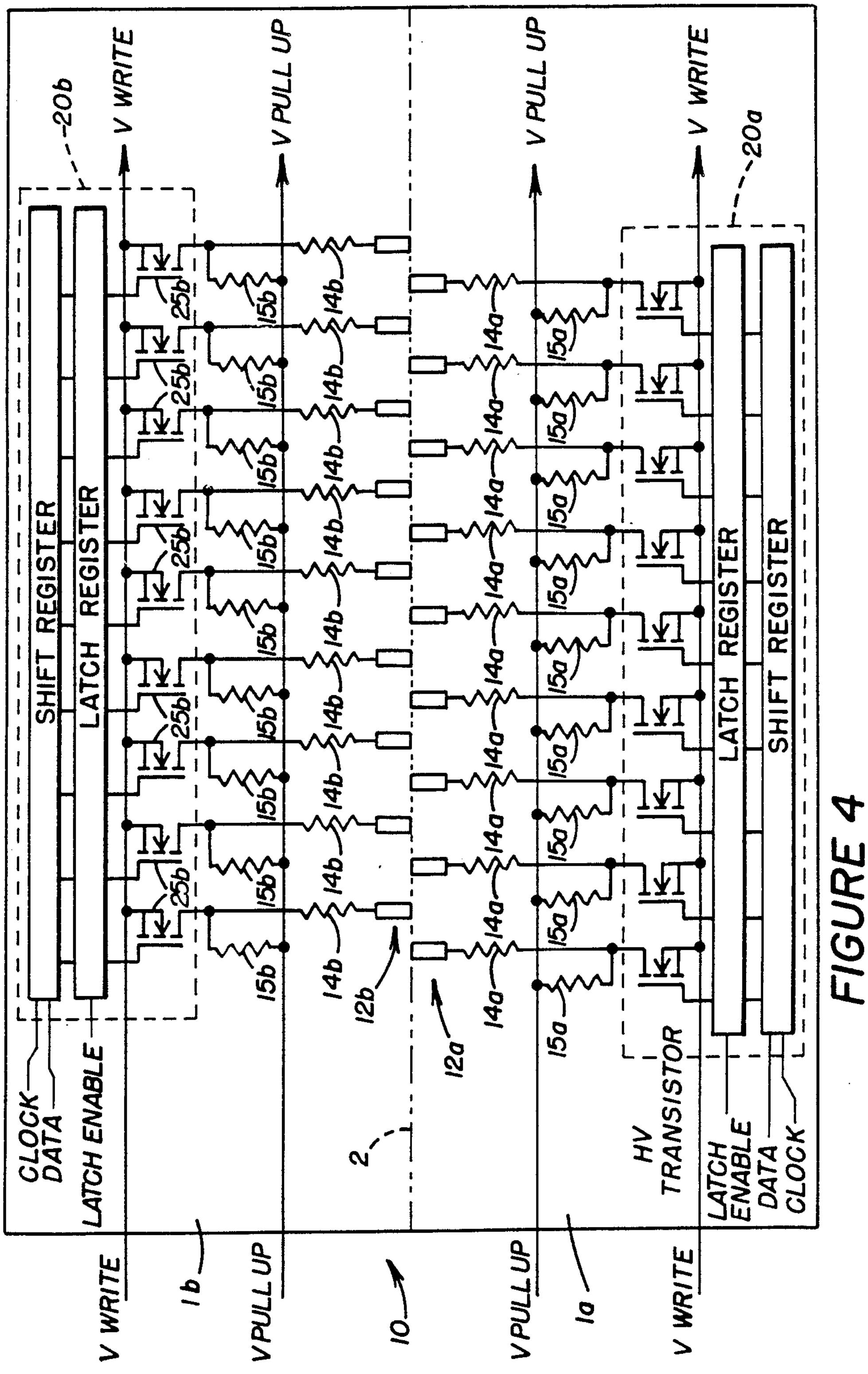
FIG. 4 is a schematic illustration of the circuit of the present invention.

Referring to FIG. 4, adjacent arrays of writing electrodes or nibs 12_a_, 12_b_ are provided on respective separate substrates 1_a_, 1_b_ which are joined together by any convenient bonding method to opposite sides of a ground plane 2. The writing nibs 12_a_, 12_b_ form an offset, interleaved pattern along the axis formed by the ground plane 2. In accordance with the present invention, each writing electrode 12_a_, 12_b_ on respective substrates 1_a_, 1_b_ is connected through a corresponding high impedance series resistor 14_a_ , 14_b_ to the drain of a single switch means 25_a_, 25_b_.

In the preferred embodiment, switch means 25_a_, 25_b_ comprise high voltage MOSFET transistors. Each MOSFET has its drain connected to the series resistor 14_a_, 14_b_ its source coupled to a negative voltage line, $V_{write}$ and its gate coupled to a data line via a latch register and shift register.

A high voltage line $V_{pull\text{-}up}$ provides a high voltage for activating the arrays of writing electrodes 12_a_, 12_b_. High voltage line $V_{pull\text{-}up}$ has a connection with each drain of switch means 25_a_, 25_b_ through a corresponding thick film high impedance pull-up resistor 15_a_, 15_b_.

It will be appreciated that each MOSFET switch 25_a_, 25_b_, together with its corresponding pull-up resistor 15_a_, 15_b_ forms a high voltage driver capable of swinging its output voltage between the levels of $V_{write}$ and $V_{pull\text{-}up}$. $V_{write}$ is approximately −500 volts relative to a counter electrode (not shown) which is at ground potential. The high voltage $V_{pull\text{-}up}$ is high enough above the negative voltage $V_{write}$ to avoid any electric discharge in the gap between the recording medium and the writing nibs 12_a_, 12_b_ when the nibs are in their inactive state.

Figure 2A:
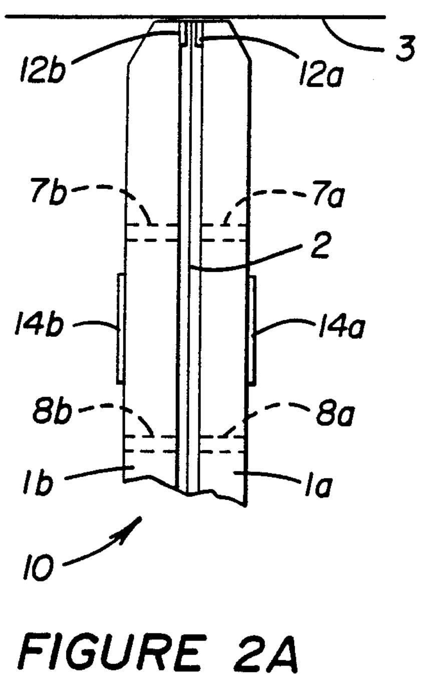
FIG. 2A is a side sectional view of an electrographic writing head according to the present invention.
Figure 2B:
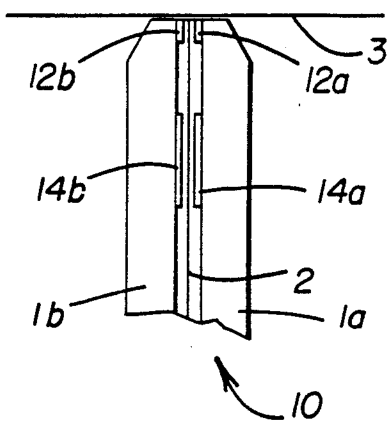
FIG. 2B is a side sectional view of an alternate embodiment of an electrographic writing head according to the present invention.

The high voltage drivers comprising semiconductor switch means 25_a_, 25_b_ and associated thick film pull-up resistors 15_a_, 15_b_ are preferably disposed on the outer layers of corresponding substrates 1_a_, 1_b_. The driver circuits connect via plated through holes 8_a_, 8_b_ (as shown in FIG. 2A) through corresponding substrates 1_a_, 1_b_. Trace lines then connect the driver circuits to the associated series resistors 14_a_, 14_b_ and the writing electrodes 12a, 12b. Note that the two inner surfaces of substrates 1a, 1b are continuously separated by the ground plane 2. Although the series resistors 14a, 14b may be on the outside surfaces of the respective substrates 1a, 1b, it is preferable to put them on the same inside layers as the writing nibs 12a, 12b and as close as possible to the writing nibs 12a, 12b in order to minimize the capacitance at the writing nib and in order to eliminate a large number of feed through holes.

The semiconductor driver circuitry as shown at 20a, 20b in FIG. 4 is packaged in standard surface mount plastic packages which are commercially available. In the preferred embodiment, the semiconductor switches are packaged in groups of 64 with a 64 bit latch and a 64 bit shift register on the same silicon die.

Figure 1:
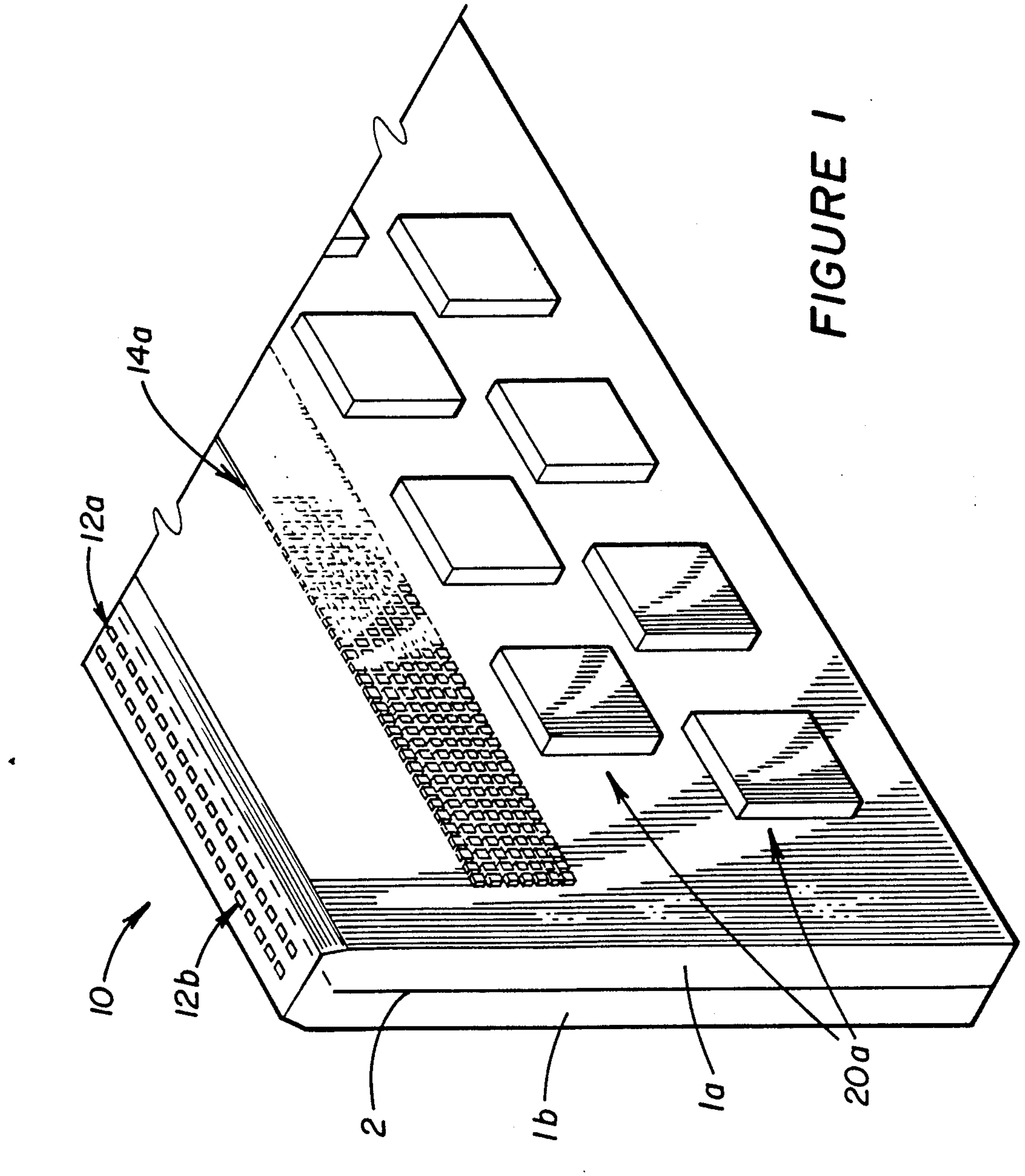
FIG. 1 is a perspective view of an integrated electrographic writing head according to the present invention.

The shift registers in all the packages are disposed on respective outer surfaces of substrates 1a and 1b as shown in FIGS. 1 and 4. These shift registers are cascaded together to form a single register of more than two thousand bits. By appropriate control of the shift register clock and data signals and the enable signal to the latch register, it is possible to load any arbitrary pattern into the latch register which directly controls the gates on the high voltage MOSFET switches 25a, 25b on each respective substrate 1a, 1b.

It will be appreciated that each writing nib on a single substrate, for example 1a, is connected to a single corresponding high voltage driver circuit 20a. Thus, in accordance with the present invention, there is one complete drive circuit 20a, 20b associated with each writing nib 12a, 12b of the array of writing nibs. It will be appreciated that the present invention completely eliminates multiplexing at the writing nibs thereby overcoming the prior art problems of banding and striations in the written image.

Further in accordance with the present invention, each writing electrode 12a, 12b is connected to its associated high voltage driver 20a, 20b through a series resistor 14a, 14b which decouples the corresponding writing electrode 12a, 12b from the capacitance of the printed circuit trace providing the voltage to each writing nib, thereby minimizing the problem of flaring. Therefore, the only capacitance capable of delivering energy to form a flare is downstream of the series resistors 14a, 14b. The closer the series resistors 14a, 14b are to the associated writing nibs 12a, 12b , the smaller will be the parasitic capacitance of the circuit trace since capacitance is proportional to the printed circuit trace area at each writing nib 12a, 12b.

In operation, a high logic signal applied to the gate of a selected switch means 25a (or 25b) turns the switch on and current from high voltage line $V_{pull\text{-}up}$ flows through pull-up resistor 15a into the drain of switch means 25a and to the negative supply $V_{write}$. When a switch means 25a or 25b is enabled, the nib voltage is pulled down to the level of $V_{write}$ and discharges. The level of the writing voltage $V_{write}$ is approximately −500 volts. Thus, a large negative voltage is applied across the gap between a writing electrode 14a, 14b and a counter electrode on the opposite side of the recording medium. The large negative voltage creates a discharge from the writing nibs 14a, 14b which deposits charge on the paper or other recording medium. When the gate of a switch means 25a, 25b is in an off state, there is not enough voltage supplied to writing nibs to create a discharge.

It will be appreciated that the non-multiplexed nature of the present invention, wherein each high voltage driver 20a is connected to a single corresponding writing electrode 12a, provides a significant advantage over the prior art in terms of writing quality because banding is eliminated.

In the present invention, the nibs of writing electrodes 12a, 12b are planar so that when dots of charge are deposited on the recording medium 3, the size of the dot in the direction of motion is defined by the time that the nib is energized and the speed of the recording medium 3 relative to the writing head 10. The resistors 15a and 14a in series with writing electrode 12a form an RC circuit. The time constant of the RC circuit is determined by the capacitance between writing electrodes 12a and ground and the series resistors 14a. In the present invention, pull-up resistors 15a are thick film, high impedance resistors on the order of 20 mega ohms. The use of one high voltage driver 20a per writing nib 12a provides a relatively long write time per nib as compared to a prior art multiplexed writing head. Therefore, in the present invention the switching means 25a, 25b do not need to be as fast as they would for a multiplexed writing head. Furthermore, because in the present invention the entire high voltage driver circuit 20a, 20b is integrated onto a single substrate, stray capacitance is minimized. This, taken together with the lenient timing constraints due to the non-multiplexed nature, allow the use of very high impedance pull-up resistors 15a, 15b.

Due to the high impedance pull-up resistors 15a power requirements are kept at a minimum. In fact, it has been found that the power required by the present invention is less than one half of that required by a conventional prior art electrographic writing head. At the same time, the charge up time and writing speed of the writing electrodes 12a, 12b is kept within one hundred microseconds.

It will be appreciated that the present invention, in using thick film techniques for fabricating the resistor networks, is a significant departure from the prior art. The prior art focuses largely on thin film technology in order to reduce the intercoupling capacitance between writing nibs. For example, in U.S. Pat. No. 4,766,450 it was thought that thin film elements were essential to minimize intercoupling capacitance between writing nibs by reducing the cross sectional area of the nib. Accordingly, the writing tips of the writing nibs in U.S. Pat. No. 4,766,450 are only 0.5 to 1 micron thick. (See col. 4, line 66.)

However, it has been found that according to the present invention, writing nibs and associated elements can be at least 40 microns thick. Intercoupling capacitance can be substantially eliminated by using thick film elements fabricated on two separate substrates which are disposed on back-to-back relation and separated by a ground plane. The use of thick film elements according to the present invention provides substantial economic savings in manufacturing costs because thick film elements may be applied by a simple screening process to a glass epoxy substrate. In contrast, thin film elements are expensive to manufacture and must be deposited by a vacuum evaporation or sputtering method.

Accordingly, the present invention provides an improved integrated thick film writing head consisting of thick film elements which are screened on two separate substrates. The thick film high impedance resistors of the present invention are capable of withstanding high voltages while at the same time providing greatly reduced power dissipation and increased savings in terms of operation costs and reliability. The configuration of back-to-back substrates separated by a ground plane virtually eliminates intercoupling capacitances and provides enhanced writing resolution. Finally, the use of thick film resistors allows the present writing head to be non-multiplexed wherein each separate writing nib is connected to a single high voltage driver.

While the invention has been described in connection with what is presently considered to be the most practical and preferred embodiments, it is to be understood that the invention is not limited to the disclosed embodiment but, on the contrary is intended to cover various modifications and equivalent arrangements included within the spirit and scope of the appended claims.

What is claimed is:

1. A thick film electrographic writing head for recording information on a recording medium comprising:

a first planar insulating substrate having an array of writing electrodes at an edge thereof, each electrode having a nib end for placing a charge corresponding to a dot of information on a dielectric recording medium which is passed in close proximity thereto;

a second planar substrate disposed in adjacent back-to-back relation with said first substrate and having a second array of writing electrodes disposed at an edge thereof adjacent said first of writing electrodes such that said first and second arrays of writing electrodes of said corresponding first and second substrates are offset one dot width apart in the plane of said substrates and are offset two dot widths in a direction perpendicular to the plane of said substrates;

a plurality of thick film resistor means formed on said first and second substrates, each resistor means coupled to a corresponding writing electrode for substantially reducing discharge current of stray capacitances;

a plurality of switch means for selectively charging a corresponding writing electrode when said switch is in a first state, each switch means coupled with a corresponding one of said thick film resistor means;

a plurality of high impedance, thick film pull-up resistors formed on said first and second substrates, each pull-up resistor coupled between a high voltage line and a corresponding one of said plurality of switch means for controlling the charging current applied to each writing nib;

shielding means disposed between said first and second substrates for connecting writing electrodes to ground.

2. An improved electrographic writing head according to claim 1 wherein said writing electrodes have a thickness of at least 40 microns.

3. An improved electrographic writing head according to claim 1 wherein said substrates are comprised of glass epoxy material.

4. An improved electrographic writing head according to claim 1 wherein said pull-up resistor means have an impedance of several mega ohms.

5. An improved electrographic writing head according to claim 1 wherein said pull up resistor means have an impedance in a range from 5 to 10 mega ohms.

6. An improved electrographic writing head according to claim 1 wherein said shielding means comprises a continuous plane of conducting material having a connection with ground.

7. An improved electrographic writing head for forming electrostatic charges on a recording medium comprising:

a first planar substrate having an array of writing nib means formed thereon, each nib means for placing a dot of charge on said recording medium;

a second planar substrate disposed adjacent said first substrate and having a second array of writing nib means thereon adjacent said first array of writing nib means such that said writing nibs of said first and second substrates are interleaved along the plane of said substrates;

a plurality of switch means each coupled with a corresponding one of said writing nib means for selectively enabling said corresponding writing nib means when said switch is in a first state;

a plurality of high impedance, thick film pull up resistor means provided on said first and second substrates, each resistor means for coupling a high voltage line with a corresponding one of said plurality of switch means for selectively energizing a corresponding writing nib means when said switch means is in a first state;

a ground plane means disposed between said first and second substrates for preventing electrical interaction between said substrates and for shunting the electric field lines of said writing nibs to ground.

8. An improved electrographic writing head for placing electrostatic charges on a recording medium including a series of writing nib means formed on a substrate, each nib means for selectively placing an electrostatic charge on a recording medium in close proximity thereto upon application of a voltage;

the improvement comprising a ground plane means disposed parallel to the plane of the writing nib means and at a distance therefrom for controlling the effects of nib-to-nib parasitic capacitance.

9. An apparatus as in claim 8 wherein said conducting means comprises a ground plane electrically isolated from said writing nibs by a thin layer of nonconducting material for terminating and shunting to ground electric field lines developed at said nibs upon application of said voltage.

10. In an improved electrographic writing head for forming charges upon a dielectric recording medium by selective application of a voltage to a series of writing nibs for producing an electrical discharge therefrom, the improvement comprising:

a ground plane means disposed parallel to the plane of the writing nibs and at a distance therefrom for controlling the effects of nib-to-nib parasitic capacitance.

* * * * *